D. VAN HOVENBERG.
Milk-Cooler.

No. 223,661. Patented Jan. 20, 1880.

ATTEST:
E. Laass.
J. W. Hey.

INVENTOR:
David Van Hovenberg
per Duell, Laass & Hey
attorneys

UNITED STATES PATENT OFFICE.

DAVID VAN HOVENBERG, OF POMPEY, NEW YORK.

MILK-COOLER.

SPECIFICATION forming part of Letters Patent No. 223,661, dated January 20, 1880.

Application filed September 3, 1879.

*To all whom it may concern:*

Be it known that I, DAVID VAN HOVENBERG, of Pompey, in the county of Onondaga, in the State of New York, have invented new and useful Improvements in Milk-Coolers, of which the following, taken in connection with the accompanying drawings, is a full, clear, and exact description.

This invention relates to improvements in the milk-cooler for which I have obtained Letters Patent No. 218,463.

The invention consists, principally, in improved devices for controlling the flow of the cooling-water, whereby the same can invariably be conducted first through the already partially-cooled milk, and finally to the newly-set and warm milk, without the necessity of changing the milk-pans in their relative position in the rack, all as hereinafter more fully described, and specifically set forth in the claim.

Figure 1:
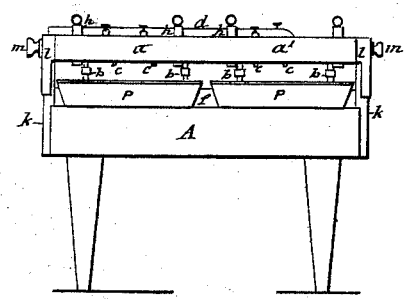
Figure 3:
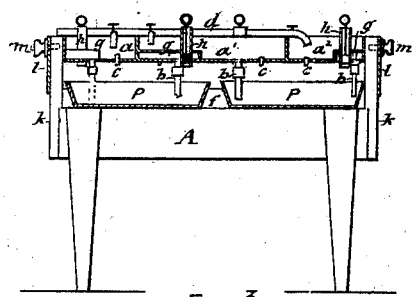
Figure 2:
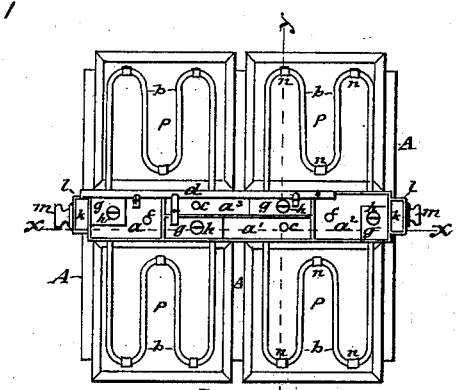
Figure 4:
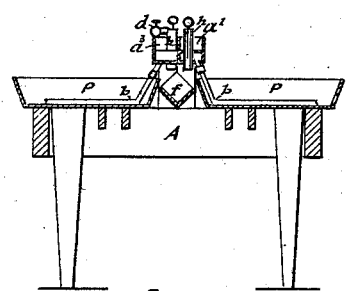
Figure 5:
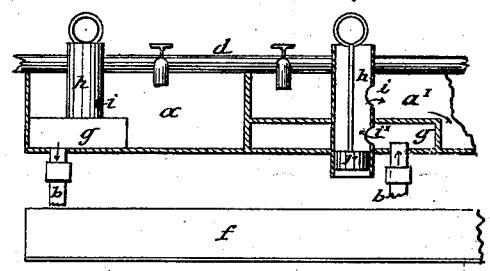

In the accompanying drawings, Figure 1 is a front elevation of my improved milk-cooler; Fig. 2, a plan view of same; Fig. 3, a vertical section on line $x$ $x$, Fig. 2; Fig. 4, a vertical section on line $y$ $y$, Fig. 2; Fig. 5, an enlarged detail view of the devices for controlling the flow of the cooling-water; and Fig. 6, an enlarged detail view of the pipe-coupling.

Similar letters of reference indicate corresponding parts.

A represents the milk rack or table, of ordinary construction, having a level top, upon which are placed the milk-pans P P. Above the pans is a series of troughs, $a$ $a'$ $a^2$ $a^3$, all arranged in the same plane and without direct communication with each other, except through the medium of the cooling-pipes $b$ $b$ in the pans, which pipes being connected at one end with one of the troughs and at the opposite end with the adjacent trough, respectively, a continuous connection is obtained throughout the series of troughs and through the pipes connected therewith. The pipes $b$ $b$ tap the bottom of the troughs, which, being on a level with each other, admit of the flow of water produced by the elevated feed-pipe $d$ and the outlet $c$ in the bottom of the last trough.

In order to obtain control of the flow of the water so as to invariably bring it to act on the longest set and coldest milk first, and then on the milk set subsequently, in accordance with the period of their respective settings, and thus cool the new and last set milk gradually, the feed-pipe $d$ is provided with a faucet for each trough.

Over the discharge end of each cooling-pipe $b$ is a shallow chamber, $g$, through which is extended a vertical tube, $h$, having its lower extremity communicating with the waste-trough $f$, and the opposite end projecting above the chamber, and provided with orifices $i$ and $i'$ at the outside and inside of the chamber, respectively.

Within the tube $h$ is a stopper, $r$, connected to an upward-projecting rod, by which the said stopper can be pushed below the lower orifice, $i'$, or drawn above the same. The former position closes the communication between the tube $h$ and the waste-trough $f$, and compels the water which emerges from the discharge end of the cooling-pipe $b$ and enters the tube through the orifice $i'$ to ascend and escape through the upper orifice, $i$, into the trough, from whence it passes into the cooling-pipe $b$ of the succeeding pan.

My improved cooling apparatus is operated as follows: The successive milkings being set in the pans in the order indicated, the cooling-water is conducted first through the pan containing the longest set and coolest milk, then through the succeeding pans, in the order aforesaid, by closing the outlets $c$ in all the troughs and opening only that faucet of the feed-pipe $d$ which discharges the water into the trough connected with the reception end of the cooling-pipe in the pan containing the oldest milk. The stoppers $r$ of the intermediate troughs being pushed down allow the water to pass from one cooling-pipe to the other, and the stopper $r$ at the discharge end of the last of the cooling-pipes, which is in the newly-set milk, being drawn up, causes the water, after its circuit through said pipe, to escape into the waste-pipe $f$.

It will be observed that this circuit can be obtained from any point of the apparatus, and thus the desired result obtained without the necessity of changing the pans in their relative position in the rack, which by my former invention could not be accomplished.

Should it be desired to limit the circuit on account of the removal of some of the pans for repairs or for want of milk, it is only necessary to draw up the stopper $r$ at the required point.

The cleaning of the troughs is facilitated by the outlets c, which are provided with removable stoppers.

To render the apparatus adjustable to the variations in the quantities of milk to be treated during different seasons of the year, the troughs a a' a² a³ are formed in or connected to a frame provided at the ends with a socket, l, which embraces a standard, k, attached to the rack, and is supported at the desired elevation by clamp-screws m, passing through said sockets. By raising and lowering the troughs the cooling-pipes b b connected thereto are carried with them and immersed in the milk the required depth.

Figure 6:
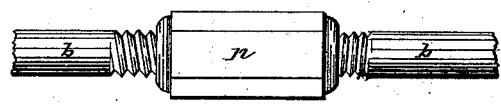

To facilitate the cleaning and repairs of the cooling-pipes b, I make them in sections, united by right and left differential screw-threaded couplings n, as best shown in Fig. 6 of the drawings.

The object of using the differential screw is to avoid its detachment from both sections while disconnecting one of them, and admit of its entire removal when desired.

Having thus described my improvements, what I claim is—

The combination of the troughs a a' a² a³, having connected to their bottom the pipes b b b b, and provided with the shallow chamber g, tube h, and stopper r, and the elevated feed-pipe d, provided with a faucet for each of the said troughs, substantially as described and shown, for the purpose set forth.

In testimony whereof I have hereunto signed my name and affixed my seal, in the presence of two attesting witnesses, at Syracuse, in the county of Onondaga and State of New York, this 19th day of August, 1879.

DAVID VAN HOVENBERG. [L. S.]

Witnesses:
 E. LAASS,
 G. W. HEY.